United States Patent
Shibao

(10) Patent No.: US 8,464,082 B2
(45) Date of Patent: Jun. 11, 2013

(54) MANAGEMENT APPARATUS, MANAGEMENT METHOD, PROGRAM AND STORAGE MEDIUM

(75) Inventor: Koki Shibao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1276 days.

(21) Appl. No.: 11/765,559

(22) Filed: Jun. 20, 2007

(65) Prior Publication Data

US 2008/0144086 A1    Jun. 19, 2008

(30) Foreign Application Priority Data

Dec. 19, 2006 (JP) .................................. 2006-341131

(51) Int. Cl.
*G06F 1/00* (2006.01)

(52) U.S. Cl.
USPC .......... 713/310; 713/320; 713/323; 358/1.14; 358/1.15

(58) Field of Classification Search
USPC .............. 358/1.15, 1.13, 1.14, 1.16; 713/310, 713/320, 323, 324
See application file for complete search history.

(56) References Cited

U.S. PATENT DOCUMENTS

| | | | | |
|---|---|---|---|---|
| 5,872,928 A | * | 2/1999 | Lewis et al. | 709/222 |
| 5,886,689 A | * | 3/1999 | Chee et al. | 345/212 |
| 6,408,395 B1 | * | 6/2002 | Sugahara et al. | 713/310 |
| 2006/0256375 A1 | * | 11/2006 | Abe | 358/1.15 |

FOREIGN PATENT DOCUMENTS

JP   2003-078671   3/2003

* cited by examiner

*Primary Examiner* — Vu B Hang
(74) *Attorney, Agent, or Firm* — Fitzpatrick, Cella, Harper & Scinto

(57) ABSTRACT

A management apparatus which manages plural information processors, manages information indicating at least one of the information processors, belonging to a first group and at least one of the information processors, belonging to a second group; stores first and second schedule information respectively corresponding to the first and second groups, each schedule information indicating a schedule of a power mode to be set on each information processor belonging to the corresponding group; instructs to change over the power mode based on the first or second schedule information; determines, if the power mode indicated by the first schedule information is different from that indicated by the second schedule information, which of the power modes is to be set with priority; and controls so that the power mode determined to be set with priority is set on the information processor belonging to both the first group and the second group.

13 Claims, 14 Drawing Sheets

| | CPU | UI | NETWORK | SCANNER | PRINTER |
|---|---|---|---|---|---|
| 301 — NORMAL MODE | ON | ON | ON | ON | ON |
| 302 — POWER SAVING MODE I | ON | OFF | ON | ON | OFF |
| 303 — POWER SAVING MODE II | OFF | OFF | ON | OFF | OFF |

| | CPU | UI | NETWORK | PRINTER |
|---|---|---|---|---|
| 501 — NORMAL MODE | ON | ON | ON | ON |
| 502 — POWER SAVING MODE I | ON | OFF | ON | OFF |
| 503 — POWER SAVING MODE II | OFF | OFF | ON | OFF |

| | CPU | DISPLAY | NETWORK |
|---|---|---|---|
| 701 — NORMAL MODE | ON | ON | ON |
| 702 — POWER SAVING MODE I | ON | OFF | ON |
| 703 — POWER SAVING MODE II | OFF | OFF | ON |

FIG. 9

| GROUP 1 | | GROUP 2 | |
|---|---|---|---|
| MFP101 | 123.456.789.101 | MFP102 | 123.456.789.102 |
| MFP102 | 123.456.789.102 | NP104 | 123.456.789.104 |
| MFP103 | 123.456.789.103 | PC105 | 123.456.789.105 |

| GROUP 1 | | GROUP 2 | |
|---|---|---|---|
| 00:00 ~ 09:00 | POWER SAVING MODE II | 00:00 ~ 08:00 | POWER SAVING MODE II |
| 09:00 ~ 11:00 | NORMAL MODE | 08:00 ~ 17:00 | NORMAL MODE |
| 11:00 ~ 13:00 | POWER SAVING MODE I | 17:00 ~ 24:00 | POWER SAVING MODE II |
| 13:00 ~ 16:00 | NORMAL MODE | | |
| 16:00 ~ 24:00 | POWER SAVING MODE II | | |

1001　1002

| GROUP 1 | | |
|---|---|---|
| REPRESENTATIVE | MFP101 | 123.456.789.101 |
| | MFP102 | 123.456.789.102 |
| | MFP103 | 123.456.789.103 |

1801   1802

MANAGEMENT APPARATUS, MANAGEMENT METHOD, PROGRAM AND STORAGE MEDIUM

BACKGROUND OF THE INVENTION

1. Field of the Invention

The present invention relates to a management apparatus which manages a plurality of information processing apparatuses by grouping them and indicates a changeover of a power mode according to schedule information corresponding to each group, a management method which is executed by the management apparatus, a program which is used to execute the management method, and a storage medium which computer-readably stores therein the program.

2. Description of the Related Art

In recent years, as the performances of information equipments such as office equipments and home electric appliances are improved, there occurs a problem that power consumption of each information equipment increases even in a standby state. In particular, with respect to a printer, a copying machine or the like, if a state capable of executing an image formation process at all times is set, there is a possibility that energy resources are wasted. To solve such a problem, recently, an information equipment which includes a power saving mode of being on standby with power consumption smaller than that in a normal operation standby state is conceived.

More specifically, with respect to the copying machine, if a predetermined time elapses after the operation by a user ended, it is possible to cause the copying machine to come into a sleep state by stopping power supply to an image formation unit of the copying machine as maintaining a state of a main power source being ON. Thus, in a case where the user again operates to execute the image formation process, it is possible to reduce power consumption in the operation standby state although it takes some time to execute a return process from the sleep state, whereby it is possible to save energy resources.

Incidentally, there is a case where the plurality of above-described information equipments are linked to be used. For example, it is conceivable that a plurality of information devices are linked together and used in a series of workflows to be executed in an office or the like. Further, it is also conceivable to distribute one image formation job to a plurality of copying machines connected through a network so as to cause them to execute the respective distributed image formation jobs (this is called a cascade copying operation). Furthermore, it is possible to connect a single-function scanner, a single-function printer, a facsimile terminal, a server storage device and the like through a network so as to use them as a virtual multifunction apparatus by properly combining the respective functions with others.

In these cases, if a part of the plurality of necessary information equipments has shifted to a sleep state, it takes time to return to a normal operable state. Thus, there is a possibility that whole operating efficiency is affected.

For this reason, it is conceivable to previously gather and group a plurality of information equipments, manage shift time information representing a shift time from a normal power mode to a power saving mode in association with each group, and shift in a lump the power modes of the information equipments in the certain group to the power saving mode (for example, Japanese Patent Application Laid-Open No. 2003-078671). That is, by managing in a lump the settings of the power modes of the plurality of information equipments as described above, it is possible to suitably shift and return the power mode of the information equipment to and from the power saving mode.

However, in the above related art, a problem may occur in a case where one information processing apparatus achieves respectively different functions and executes a series of workflows in cooperation with a plurality of different information processing apparatuses. More specifically, in a case where one information processing apparatus belongs to a plurality of different groups, if it is instructed to designate a power saving mode to one group and designate a normal power mode to other groups, the contents of such instructions compete with each other. Thus, there is a possibility that it is impossible to execute an appropriate operation.

The present invention has been completed in consideration of such a problem. That is, the present invention aims to provide a management apparatus which determines, in a case where power modes to be set to an information processing apparatus which belongs to a plurality of different groups each including at least one information processing apparatus are different in the respective groups, which power mode is to be set with priority for the relevant information processing apparatus, a management method which is executed by the management apparatus, the information apparatus itself, a control method for the information apparatus, a program which is used to execute the management method, a program which is used to execute the control method, and a storage medium which computer-readably stores therein the relevant program.

SUMMARY OF THE INVENTION

The present invention provides a data management apparatus, a data management method and a storage medium which overcome the above-described problem.

That is, according to one aspect of the present invention, there is provided a management apparatus which manages a plurality of information processing apparatuses, which management apparatus comprises: a management unit configured to manage information indicating at least one information processing apparatus, from among the plurality of information processing apparatuses, which belongs to a first group and at least one information processing apparatus, from among the plurality of information processing apparatuses, which belongs to a second group; a memory unit configured to store first schedule information corresponding to the first group and second schedule information corresponding to the second group, each of the first schedule information and the second schedule information indicating a schedule of a power mode which is to be set on each of the information processing apparatus belonging to the corresponding group; an instruction unit configured to instruct the information processing apparatus to change over the power mode based on the first schedule information and the second schedule information; a determination unit configured to determine, in a case where the power mode, indicated by the first schedule information, to be set on the information processing apparatus belonging to both the first group and the second group is different from the power mode, indicated by the second schedule information, to be set on the information processing apparatus belonging to both the first group and the second group, which of the power mode indicated by the first schedule information and the power mode indicated by the second schedule information is to be set with priority; and a control unit configured to control the instruction unit so that the power mode which has been determined by the determination unit to be set with priority is set on the information processing apparatus belonging to both the first group and the second group.

According to another aspect of the present invention, there is provided a management method which manages a plurality of information processing apparatuses, which management method comprises the steps of: managing information indicating at least one information processing apparatus, from among the plurality of information processing apparatuses, which belongs to a first group and at least one information processing apparatus, from among the plurality of information processing apparatuses, which belongs to a second group; storing first schedule information corresponding to the first group and second schedule information corresponding to the second group, each of the first schedule information and the second schedule information indicating a schedule of a power mode which is to be set on each of the information processing apparatus belonging to the corresponding group; instructing the information processing apparatus to change over the power mode based on the first schedule information and the second schedule information; determining, in a case where the power mode, indicated by the first schedule information, to be set on the information processing apparatus belonging to both the first group and the second group is different from the power mode, indicated by the second schedule information, to be set on the information processing apparatus belonging to both the first group and the second group, which of the power mode indicated by the first schedule information and the power mode indicated by the second schedule information is to be set with priority; and controlling the instruction step so that the power mode which has been determined in the determination step to be set with priority is set on the information processing apparatus belonging to both the first group and the second group.

According to still another aspect of the present invention, there is provided a computer-readable program which is used to execute a management method of managing a plurality of information processing apparatuses, which management method comprises the steps of: managing information indicating at least one information processing apparatus, from among the plurality of information processing apparatuses, which belongs to a first group and at least one information processing apparatus, from among the plurality of information processing apparatuses, which belongs to a second group; storing first schedule information corresponding to the first group and second schedule information corresponding to the second group, each of the first schedule information and the second schedule information indicating a schedule of a power mode which is to be set on each of the information processing apparatus belonging to the corresponding group; instructing the information processing apparatus to change over the power mode based on the first schedule information and the second schedule information; determining, in a case where the power mode, indicated by the first schedule information, to be set on the information processing apparatus belonging to both the first group and the second group is different from the power mode, indicated by the second schedule information, to be set on the information processing apparatus belonging to both the first group and the second group, which of the power mode indicated by the first schedule information and the power mode indicated by the second schedule information is to be set with priority; and controlling the instruction step so that the power mode which has been determined in the determination step to be set with priority is set on the information processing apparatus belonging to both the first group and the second group.

According to still another aspect of the present invention, there is provided a computer-readable storage medium which stores therein a program to be used to execute a management method of managing a plurality of information processing apparatuses, which management method comprises the steps of: managing information indicating at least one information processing apparatus, from among the plurality of information processing apparatuses, which belongs to a first group and at least one information processing apparatus, from among the plurality of information processing apparatuses, which belongs to a second group; storing first schedule information corresponding to the first group and second schedule information corresponding to the second group, each of the first schedule information and the second schedule information indicating a schedule of a power mode which is to be set on each of the information processing apparatus belonging to the corresponding group; instructing the information processing apparatus to change over the power mode based on the first schedule information and the second schedule information; determining, in a case where the power mode, indicated by the first schedule information, to be set on the information processing apparatus belonging to both the first group and the second group is different from the power mode, indicated by the second schedule information, to be set on the information processing apparatus belonging to both the first group and the second group, which of the power mode indicated by the first schedule information and the power mode indicated by the second schedule information is to be set with priority; and controlling the instruction step so that the power mode which has been determined in the determination step to be set with priority is set on the information processing apparatus belonging to both the first group and the second group.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the present invention and, together with the detailed description, serve to explain the principle of the present invention.

FIG. 9 is a diagram illustrating a group management table according to the exemplary embodiment of the present invention.

FIG. 10 is a diagram illustrating a schedule management table according to the exemplary embodiment of the present invention.

DESCRIPTION OF THE EMBODIMENTS

Hereinafter, the exemplary embodiments of the present invention will be described with reference to the attached drawings.

First Exemplary Embodiment

Figure 1:
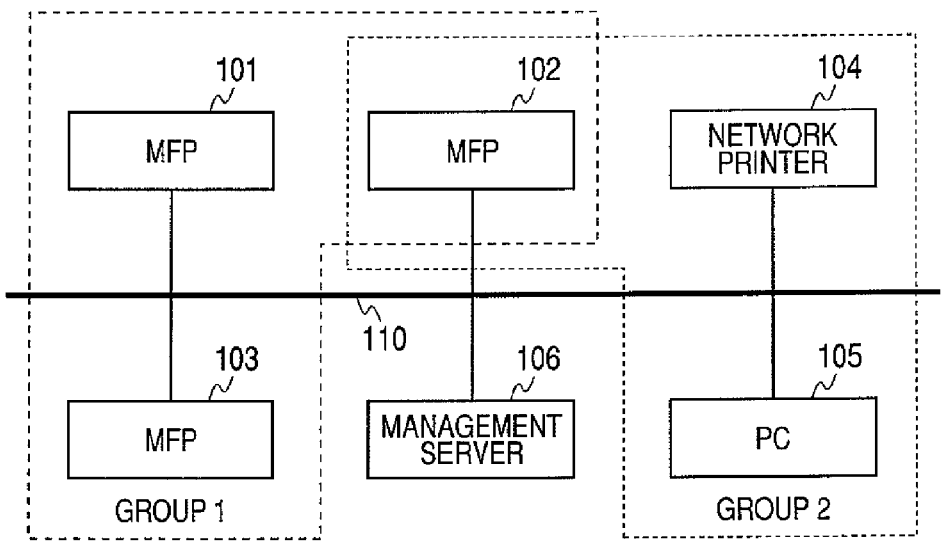
FIG. 1 is a block diagram illustrating a whole system according to the exemplary embodiment of the present invention.

FIG. 1 is a block diagram illustrating a whole system which includes a plurality of information processing apparatuses and a management server 106, according to the first exemplary embodiment of the present invention. More specifically, in the first exemplary embodiment, MFP's (multifunction peripherals) 101, 102 and 103, a network printer 104, a PC 105 and the management server 106 are mutually connected to others through a LAN (local area network) 110.

Each of the MFP's 101 to 103 is the multifunction apparatus which has an image reading function using a scanner and an image formation function using a printer, and can transmit and receive various data to and from another information processing apparatus through the LAN 110.

Figure 2:
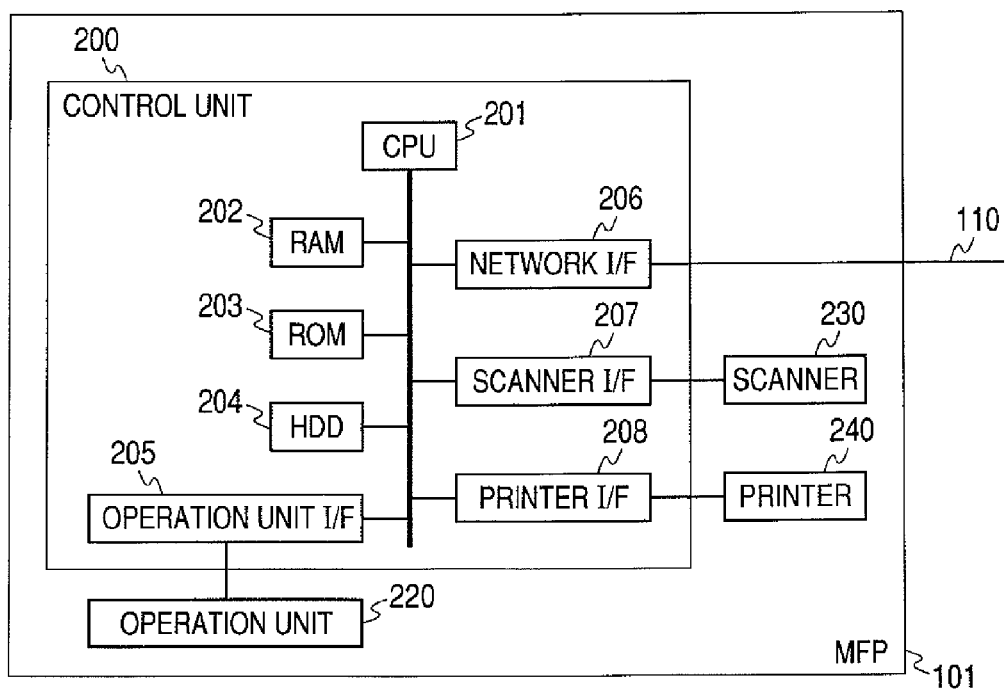
FIG. 2 is a system block diagram illustrating an MFP (multifunction peripheral) 101 according to the exemplary embodiment of the present invention.

FIG. 2 is a system block diagram illustrating the MFP 101. Here, it should be noted that each of the MFP's 102 and 103 has the same constitution as that of the MFP 101, whereby descriptions for the MFP's 102 and 103 will be omitted.

In FIG. 2, a control unit 200, which is connected to a scanner 230 acting as an image input device and a printer 240 acting as an image output device, controls input and output of image information. Also, the control unit 200 is connected to the LAN 110 to control input and output of image information and device control information.

A CPU (central processing unit) 201, which controls the operation of the MFP 101, reads a program from a ROM (read only memory) 203 to a RAM (random access memory) 202 and operates based on the read program. The RAM 202 is the image memory which temporarily stores therein image data, and the ROM 203 is the boot ROM which stores therein a boot program for the system. An HDD (hard disk drive) 204 stores therein system software and programs for controlling the operation of the MFP 101. Incidentally, there are cases where the program stored in the HDD 204 is loaded to the RAM 202 and the CPU 201 controls the operation of the MFP 101 based on the loaded program.

An operation unit I/F (interface) 205 is the interface which connects an operation unit 220 and the control unit 200 to each other, and is used to output image data to be displayed to the operation unit 220. Further, the operation unit I/F 205 is used to transfer information input by a user from the operation unit 220 to the CPU 201. A network I/F 206 is connected to the LAN 110 to control input and output of various kinds of information.

A scanner unit I/F 207 is the interface which connects the scanner 230 and the control unit 200 to each other, and is used to execute an image conversion process to image data read from an original by the scanner 230. A printer I/F 208 is the interface which connects the printer 240 and the control unit 200 to each other, and is used to execute an image conversion process to image data output to the printer 240.

Figures 3, 4:
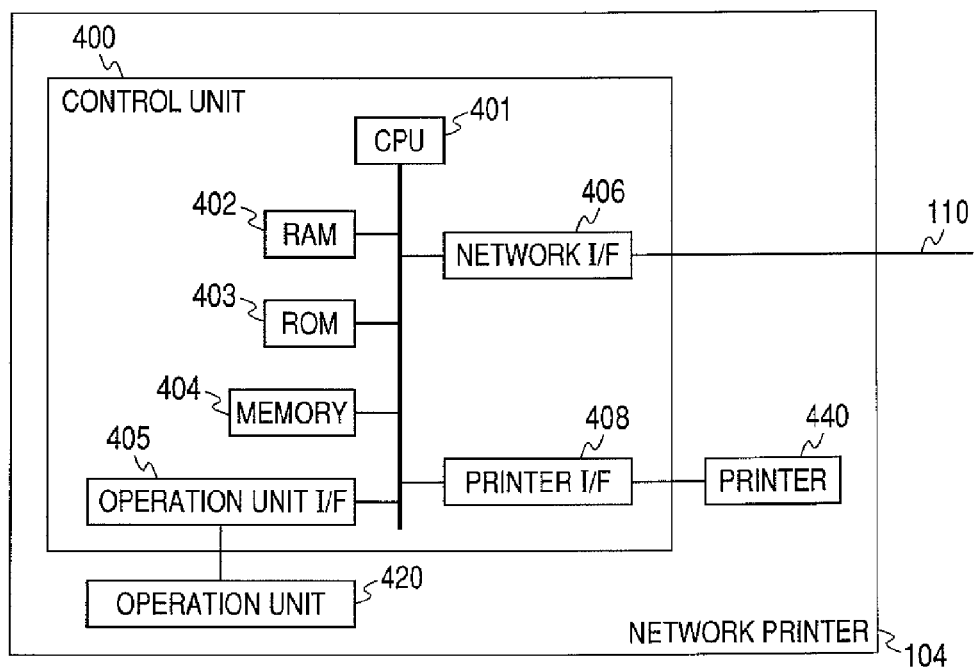
FIG. 3 is a diagram illustrating a power mode management table of the MFP 101 according to the exemplary embodiment of the present invention.
FIG. 4 is a system block diagram illustrating a network printer 104 according to the exemplary embodiment of the present invention.

FIG. 3 is a diagram illustrating a power mode management table indicating ON/OFF states of each function unit in regard to a plurality of power saving modes respectively provided by each of the MFP's 101 to 103. Here, it should be noted that, if a predetermined time or more elapses in a state of no operation by a user, each of the MFP's 101 to 103 can shift to a so-called sleep state which is the state that any power is not supplied to a part of the function units of the MFP.

In addition to a normal mode (301) that power is supplied to each of the function units to maintain its operable state while the user is operating the MFP 101, the MFP 101 has two kinds of power saving modes. More specifically, in a power saving mode I (302), as illustrated in FIG. 3, the CPU 201 is in the operable state, and also the network connection unit (the network I/F 206) and the scanner function unit (the scanner I/F 207, and the scanner 230) are in the operable state.

On the other hand, the UI (user interface) function unit (the operation unit I/F 205, and the liquid crystal panel display unit provided on the operation unit 220) on the liquid crystal operation panel unit of the operation unit 220 and the printer function unit (the printer I/F 208, and the printer 240) are in a power-OFF state. This is because, since the UI function unit having an UI screen and the printer function unit require a measurable amount of power to maintain their operable states, energy sources are wasted if the operable states thereof are maintained in despite of no operation by the user.

Furthermore, in a power saving mode II (303), as illustrated in FIG. 3, all the function units other than the network connection unit are in the power-OFF state. That is, if power saving mode II (303) is set, it is possible to be on standby with less power than that in the power saving mode I (302). This is called a deep sleep state.

Incidentally, a mode changeover from the normal mode to each power saving mode is executed automatically when it is detected that a certain time elapses from no operation of the MFP 101 by the user. Further, as described later, if it is instructed from an external apparatus such as the management server 106 or the like to change over the power saving mode, the power mode is actually changed over according to such an instruction. On the other hand, a mode return from each power saving mode to the normal mode is executed when an operation by the user is detected or when an instruction from the external apparatus is input.

FIG. 4 is a system block diagram illustrating the network printer 104. Here, it should be noted that the network printer 104 can receive and print image data transferred from each of the MFP's 101 to 103 or the PC 105 all connected through the network.

A control unit 400, which is connected to a printer 440 acting as an image output device, controls output of image information. Also, the control unit 400 is connected to the LAN 110 to control input and output of image information, device control information and the like.

A CPU 401 controls the operation of the network printer 104. More specifically, the CPU 401 reads a program from a ROM 403 to a RAM 402, and operates based on the read program. The RAM 402 is the image memory which temporarily stores therein image data, and the ROM 403 is the boot ROM which stores therein a boot program for the system. A memory 404 stores therein system software, image data and programs for controlling the operation of the network printer 104. Incidentally, there are cases where the program stored in the memory 204 is loaded to the RAM 402 and the CPU 401 controls the operation of the network printer 104 based on the loaded program.

An operation unit I/F 405 is the interface which connects an operation unit 420 and the control unit 400 to each other, and is used to output image data to be displayed to the operation unit 420. Further, the operation unit I/F 405 is used to transfer information input by the user from the operation unit 420 to the CPU 401. A network I/F 406 is connected to the LAN 110 to control input and output of various kinds of information.

A printer I/F 408 is the interface which connects the printer 440 and the control unit 400 to each other, and is used to execute an image conversion process to the image data output to the printer 440. Further, the printer I/F 408 also has an RIP (raster image processor) function to extract a PDL (page description language) code received from the PC 105 into a bitmap image.

Figures 5, 6:
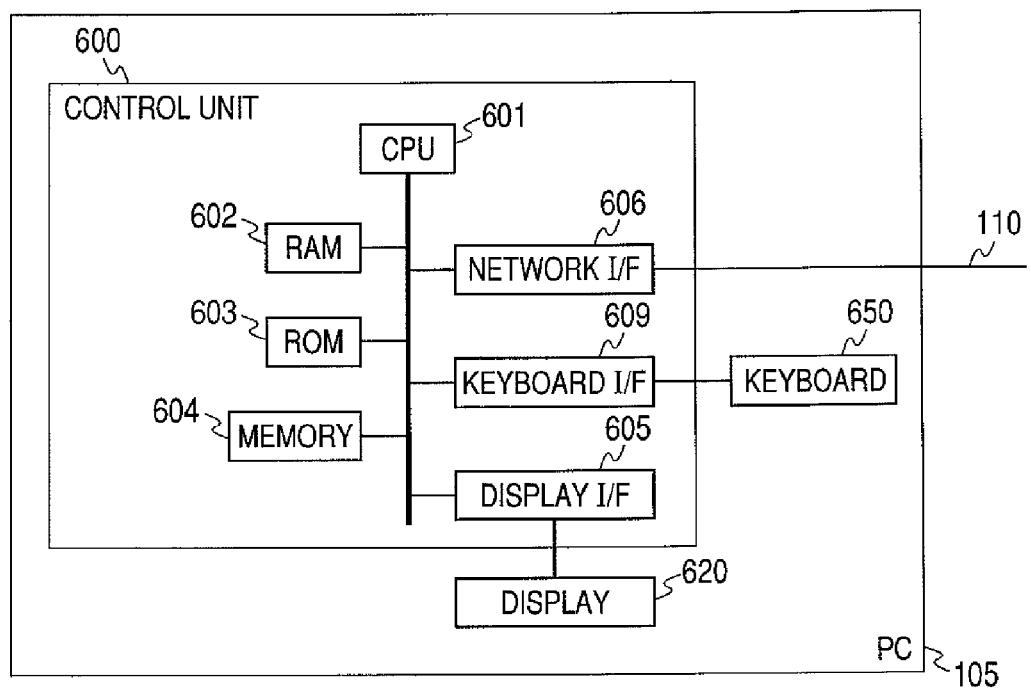
FIG. 5 is a diagram illustrating a power mode management table of the network printer 104 according to the exemplary embodiment of the present invention.
FIG. 6 is a system block diagram illustrating a PC (personal computer) 105 according to the exemplary embodiment of the present invention.

FIG. 5 is a diagram illustrating a power mode management table indicating ON/OFF states of each function unit in regard to a plurality of power saving modes respectively provided by the network printer 104. Here, as well as the above-described MFP 101, it should be noted that, as the power modes capable of being set, the network printer 104 has two kinds of power saving modes in addition to a normal mode (501).

More specifically, in a power saving mode I (502), as illustrated in FIG. 3, the CPU 401 is in the operable state, and also the network connection unit (the network I/F 406) is in the operable state. On the other hand, the UI function unit (the operation unit I/F 405, and the liquid crystal panel display unit provided on the operation unit 420) on the liquid crystal operation panel unit of the operation unit 420 and the printer function unit (the printer I/F 408, and the printer 440) are in a power-OFF state.

Further, in a power saving mode II (503), as illustrated in FIG. 5, all the function units other than the network connection unit are in the power-OFF state. Incidentally, a mode changeover from the normal mode to each power saving mode on the network printer 104 is executed substantially in the same manner as that for the MFP 101.

FIG. 6 is a system block diagram illustrating the PC 105. Here, it should be noted that the PC 105 can transmit and receive image data to and from each of the MFP's 101 to 103 connected through the network, and further transmit image data to the network printer 104 for printing it.

A control unit 600 is connected to the LAN 110 to control input and output of image information, device control information and the like. A CPU 601 controls the operation of the PC 105. More specifically, the CPU 601 reads a program from a ROM 603 to a RAM 602, and operates based on the read program. The RAM 602 is the image memory which temporarily stores therein image data, and the ROM 603 is the boot ROM which stores therein a boot program for the system. A memory 604 stores therein system software, image data and programs for controlling the operation of the PC 105. Incidentally, there are cases where the program stored in the memory 604 is loaded to the RAM 602 and the CPU 601 controls the operation of the PC 105 based on the loaded program.

A display I/F 605 is the interface which connects a display 620 and the control unit 600 to each other, and is used to output image data to be displayed on the display 620. Further, a keyboard I/F 609 is used to transfer to the CPU 601 instructions input by the user through a keyboard 650. A network I/F 606 is connected to the LAN 110 to control input and output of various kinds of information.

Figures 7, 8:
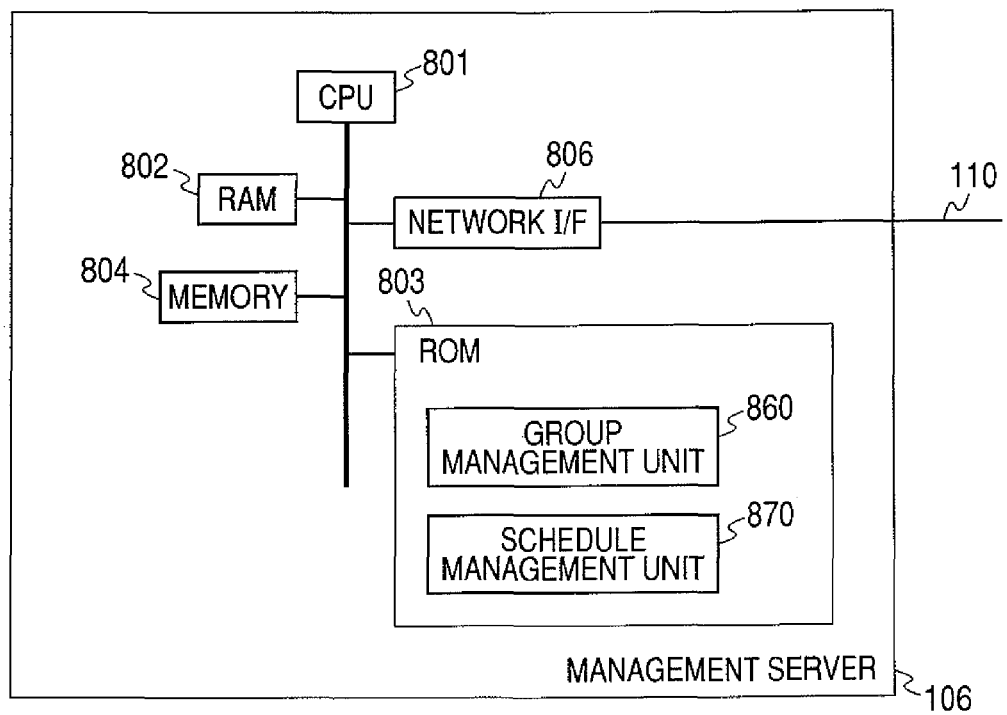
FIG. 7 is a diagram illustrating a power mode management table of the PC 105 according to the exemplary embodiment of the present invention.
FIG. 8 is a system block diagram illustrating a management server 106 according to the exemplary embodiment of the present invention.

FIG. 7 is a diagram illustrating a power mode management table indicating ON/OFF states of each function unit in regard to a plurality of power saving modes respectively provided by the PC 105. Here, as well as the above-described MFP 101, it should be noted that, as the power modes capable of being set, the PC 105 has two kinds of power saving modes in addition to a normal mode (701).

More specifically, in a power saving mode I (702), as illustrated in FIG. 7, the CPU 601 is in the operable state, and also the network connection unit (the network I/F 606) is in the operable state. On the other hand, the display function unit (the display I/F 605 and the display 620) is in a power-OFF state. Further, in a power saving mode II (703), as illustrated in FIG. 7, all the function units other than the network connection unit are in the power-OFF state. Incidentally, a mode changeover on the PC 105 is executed substantially in the same manner as that for the MFP 101.

The content of each power mode set with respect to each of the MFP's 101 to 103, the network printer 104 and the PC 105 can be properly changed by the user. Further, the power saving mode II in each of the above-described apparatus may be set as a state that the power source of the main body of the apparatus is being OFF.

FIG. 8 is a system block diagram illustrating the management server 106. In the first exemplary embodiment, the management server 106 manages the settings of the power modes in the information processing apparatuses 101 to 105 in a lump.

A CPU 801 controls the operation of the management server 106. More specifically, the CPU 801 reads a program from a ROM 803 to a RAM 802, and operates based on the read program. The ROM 803 is the boot ROM which stores therein a boot program for the system. A memory 804 stores therein system software, image data, and various kinds of management information such as a group management table, a schedule management table and the like later described. A network I/F 806 is connected to the LAN 110 to control input and output of various kinds of information.

FIG. 9 is a diagram illustrating the group management table stored in the memory 804 of the management server 106. In the first exemplary embodiment, as illustrated in FIG. 1, the cooperating information processing apparatuses are selected from among the plurality of information processing apparatuses connected to the LAN 110, and the plurality of selected information processing apparatuses are managed as one group. More specifically, the MFP's 101 to 103 constituting a group 1 can mutually cooperate to achieve a cascade copying operation in which one image formation job is distributed and processed.

Further, the MFP 102, the PC 105 and the network printer 104 constituting a group 2 can be used as a virtual MFP by properly combining the functions thereof. That is, the image data read and input by the scanner of the MFP 102 is transferred to the PC 105, the transferred image data is subjected to various processes such as an image editing process, an image correction process, an image conversion process and the like by the PC 105, and then the processed image data is output from the network printer 104, whereby it is possible to achieve the copying function.

Incidentally, it should be noted that group information is managed, by using the group management table, in a group management unit 860 of the ROM 803 (FIG. 8). Besides, it is also possible to manage one information processing apparatus as one group.

In any case, when the plurality of information processing apparatuses cooperate as described above, each apparatus should be in the operable state. That is, if even one of the plurality of information processing apparatuses is in the sleep state, it takes time to return to the normal operable state, whereby operating efficiency deteriorates. Consequently, in the first exemplary embodiment, the management server 106 executes in a lump the settings of the power modes in the plurality of information processing apparatuses previously grouped by the user, thereby enabling to properly change over the setting of the power mode for each apparatus without any complicated operation.

FIG. 9 illustrates the group management table stored in the memory 804. On the group management table, names 901 and IP addresses 902 of the respective information processing apparatuses belonging to each group are managed with respect to the relevant group. Thus, according to the information on the group management table, the CPU 201 indicates in a lump the settings of the power modes for the IP addresses of the information processing apparatuses belonging to each group.

FIG. 10 is a diagram illustrating the schedule management table stored in the memory 804 of the management server 106. In the first exemplary embodiment, schedule information of the power modes to be set for respective time zones are previously set by the user with respect to each group managed on the group management table. On the schedule management table illustrated in FIG. 10, information 1002 indicating the power modes to be set for respective time zones 1001 in association with each group is managed. Incidentally, it should be noted that the schedule information is managed, by using the schedule management table, in a schedule management unit 870 of the ROM 803 (FIG. 8).

If becoming a time when it is necessary to change over the power modes set in the information processing apparatuses for each group, the management server 106 transmits a command of instructing the changeover of power mode to all of the information processing apparatuses included in the relevant group. Incidentally, it should be noted that the command to be transmitted includes information indicating to which of the plurality of power saving modes included in each information processing apparatus the current power mode should be changed over.

The information processing apparatus, which received the command for instructing the changeover of power mode from the management server 106, changes over the power mode to the power mode to be set as a default mode according to the content of the received command. Incidentally, in a case where a user's operation using the operation unit is detected while the power saving mode is being set in the information processing apparatus, the set mode is returned to the normal mode. Subsequently, if a predetermined time elapses after the end of the operation by the user, the normal mode is again changed over to the power mode set as the default mode.

Incidentally, as illustrated in FIG. 1, the MFP 102 belongs to both the group 1 and the group 2 in the first exemplary embodiment. In this case, if the power mode is changed over according to the schedule management table illustrated in FIG. 10, there is a possibility that the power mode to be set becomes different. More specifically, according to the schedule management table illustrated in FIG. 10, the power saving mode I is being instructed for the group 1 and the normal mode is being instructed for the group 2 at the time "12:00". Then, the contents of the command instructions to be transmitted to the MFP 102 are different for the respective schedule information, whereby it is impossible to achieve an accurate instruction.

For this reason, in the first exemplary embodiment, it is determined which of the power mode indicated by the schedule information managed in association with the group 1 and the power mode indicated by the schedule information managed in association with the group 2 is to be set with priority. Then, in a case where the contents (power modes) to be instructed to a certain information processing apparatus are different, the CPU 801 of the management server 106 determines which of the power modes is to be set with priority, and instructs to set the power mode determined to be set with priority.

Figure 11:
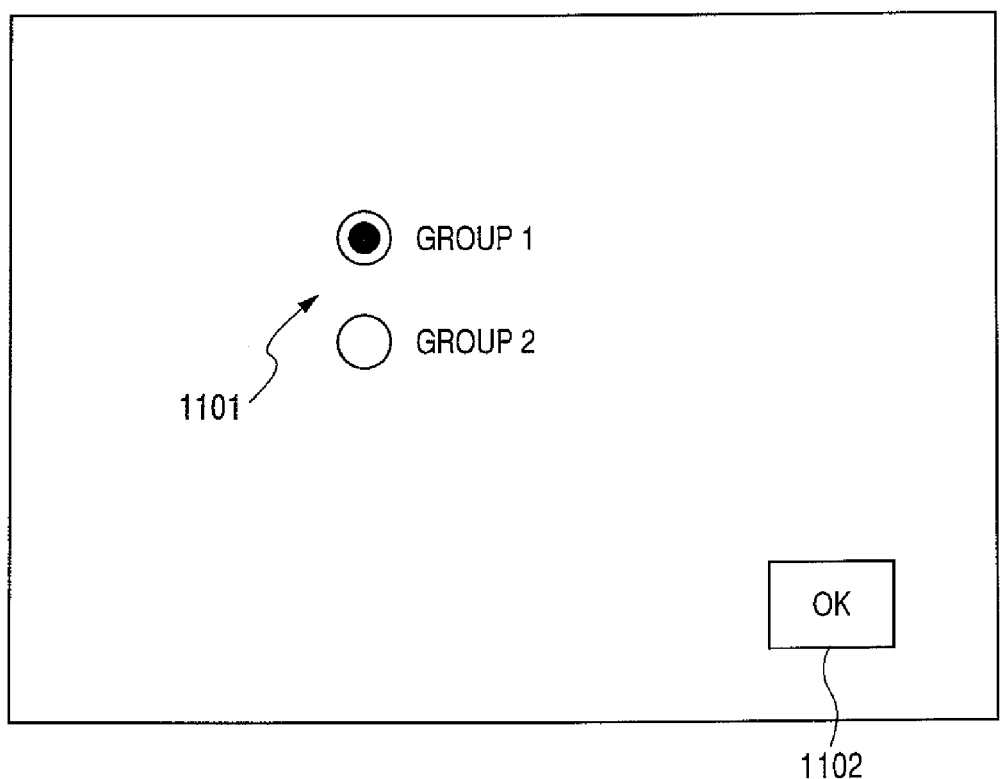
FIG. 11 is a diagram illustrating an operation screen, displayed on the operation unit, according to the exemplary embodiment of the present invention.

FIG. 11 is a diagram illustrating an operation screen, which is displayed on the operation unit 220 of the MFP 101, for urging a user to designate which of the schedule information of the respective groups is to be prioritized. More specifically, if the user selects either one of radio buttons 1101 and then depresses an OK button 1102, it is possible to designate that the schedule information of which group is to be prioritized.

Incidentally, in the present exemplary embodiment, since only the two groups are set, either one of the groups to be prioritized is alternatively selected. However, in a case where three or more groups are set, priorities may be set for the respective groups so as to set ranking of these groups.

Figure 12:
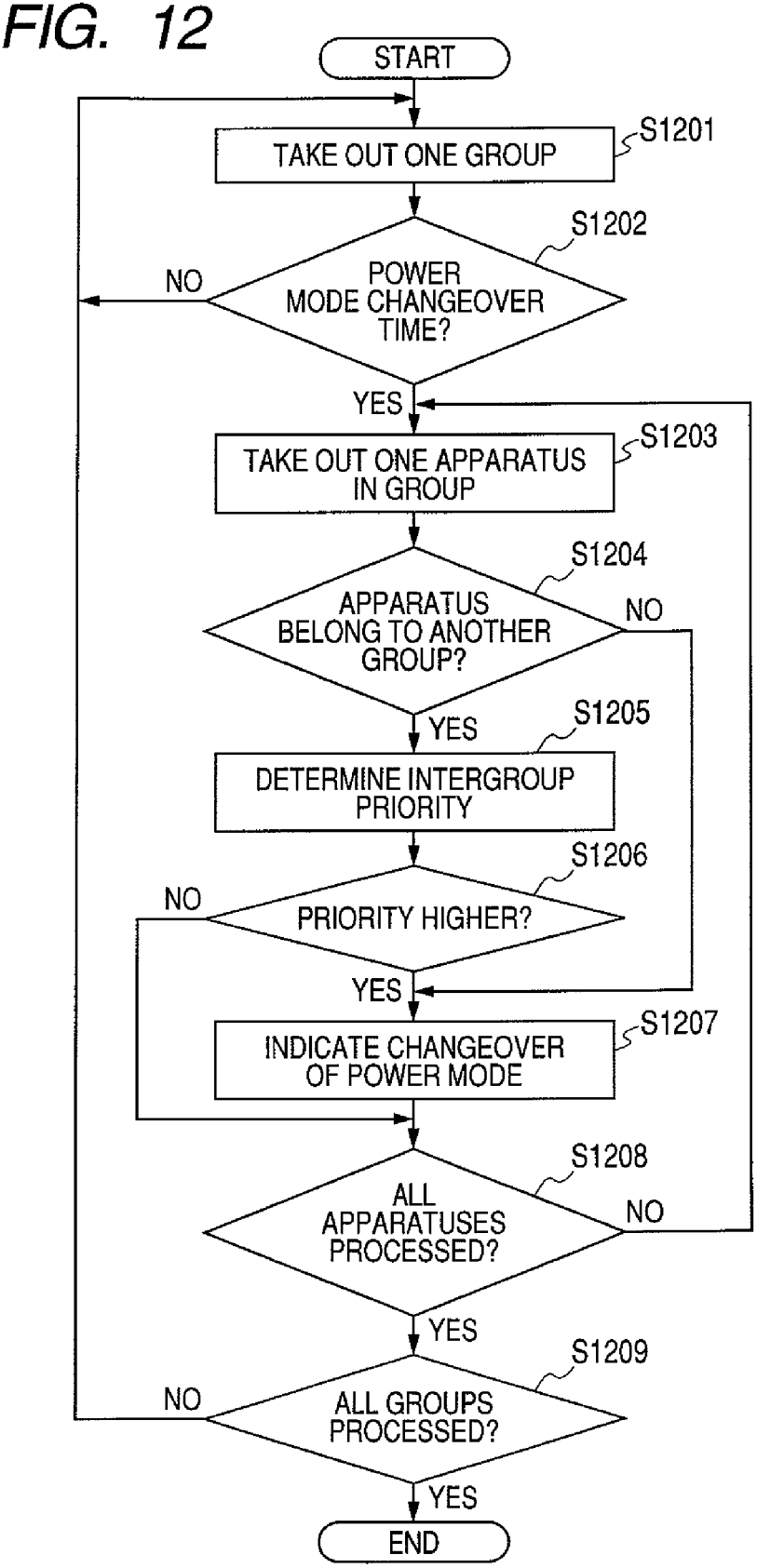
FIG. 12 is a flow chart for describing an operation of the management server 106 according to the exemplary embodiment of the present invention.

FIG. 12 is a flow chart for clearly describing a series of processes to be executed by the management server 106 according to the first exemplary embodiment. Here, it is assumed that a series of operations illustrated on the flow chart of FIG. 12 is controlled by the CPU 801 of the management server 106 based on the program stored in the ROM 803 or the memory 804 (FIG. 8).

Initially, in a step S1201, any one of the plurality of groups managed on the group management table is taken out. Subsequently, in a step S1202, the schedule information managed in association with the group taken out in the step S1201 is read from the schedule management table, and it is determined based on a current time whether or not it becomes a power mode changeover time when the changeover of power mode is necessary. Incidentally, it should be noted that a timer unit by which the user refers to time information is provided in the management server 106. In any case, if it is determined that it becomes the power mode changeover time, the flow advances to a step S1203. On the other hand, if it is determined that it does not become the power mode changeover time, the flow returns to the step S1201.

Next, in the step S1203, any one of the plurality of information processing apparatuses belonging to the group taken out in the step S1201 it taken out. Subsequently, in a step S1204, it is determined whether or not the information processing apparatus taken out in the step S1203 belongs to another group. For example, in FIG. 1, if the MFP 102 is taken out, the determined result in the step S1204 is "YES" because the MFP 102 belongs to the two groups 1 and 2. On the other hand, if the MFP 101 is taken out, the determined result in the step S1204 is "NO" because the MFP 101 belongs to only the group 1. In any case, if it is determined in the step S1204 that the information processing apparatus taken out in the step S1203 does not belong to another group, the flow advances to a step S1207.

On the other hand, if it is determined in the step S1204 that the information processing apparatus taken out in the step S1203 belongs to another group, the flow advances to a step S1205 to further determine priorities of the plurality of groups to which the relevant information processing apparatus belongs. Incidentally, it should be noted that the determination in the step S1205 is executed based on a user's instruction input by using the operation screen illustrated in FIG. 11.

Then, in a step S1206, if it is determined that the priority of the group taken out in the step S1201 is higher than the priorities of other groups, the flow advances to the step S1207. On the other hand, if it is determined in the step S1206 that the group of which the priority is higher than the priority of the group taken out in the step S1201 exists, the flow advances to a step S1208.

In the step S1207, a command for instructing to change over the power mode is transmitted to the information processing apparatus according to the information on the schedule management table. Then, the flow advances to the step S1208 to determine whether or not the processes to all the information processing apparatuses belonging to the group taken out in the step S1201 end. If the information processing apparatus to which the process does not end exits, the flow returns to the step S1203 to continue the above determination process. On the other hand, if the processes for all the information processing apparatuses end, the flow advances to a step S1209.

In the step S1209, it is determined whether or not the processes to all the groups managed on the group management table end. If the group to which the process does not end exits, the flow returns to the step S1201 to continue the above determination process. On the other hand, if the processes for all the groups end, the process ends.

Incidentally, it is assumed that the process illustrated on the flow chart of FIG. 12 is intermittently executed by the management server 106. In other words, if the determination process for all the groups managed on the group management table ends, the process illustrated on the flow chart of FIG. 12 is again executed from the beginning.

Figure 13:
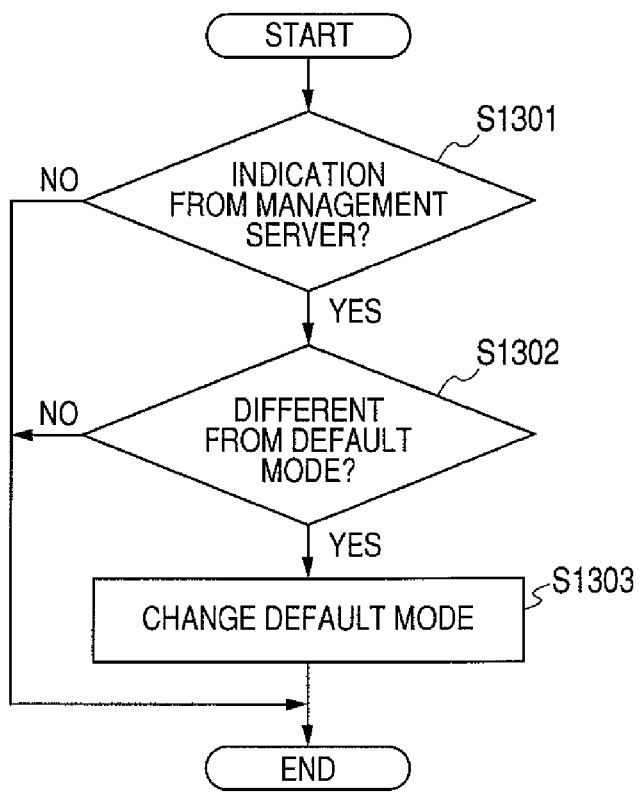
FIG. 13 is a flow chart for describing an operation of an MFP 102 according to the exemplary embodiment of the present invention.
Figure 14:
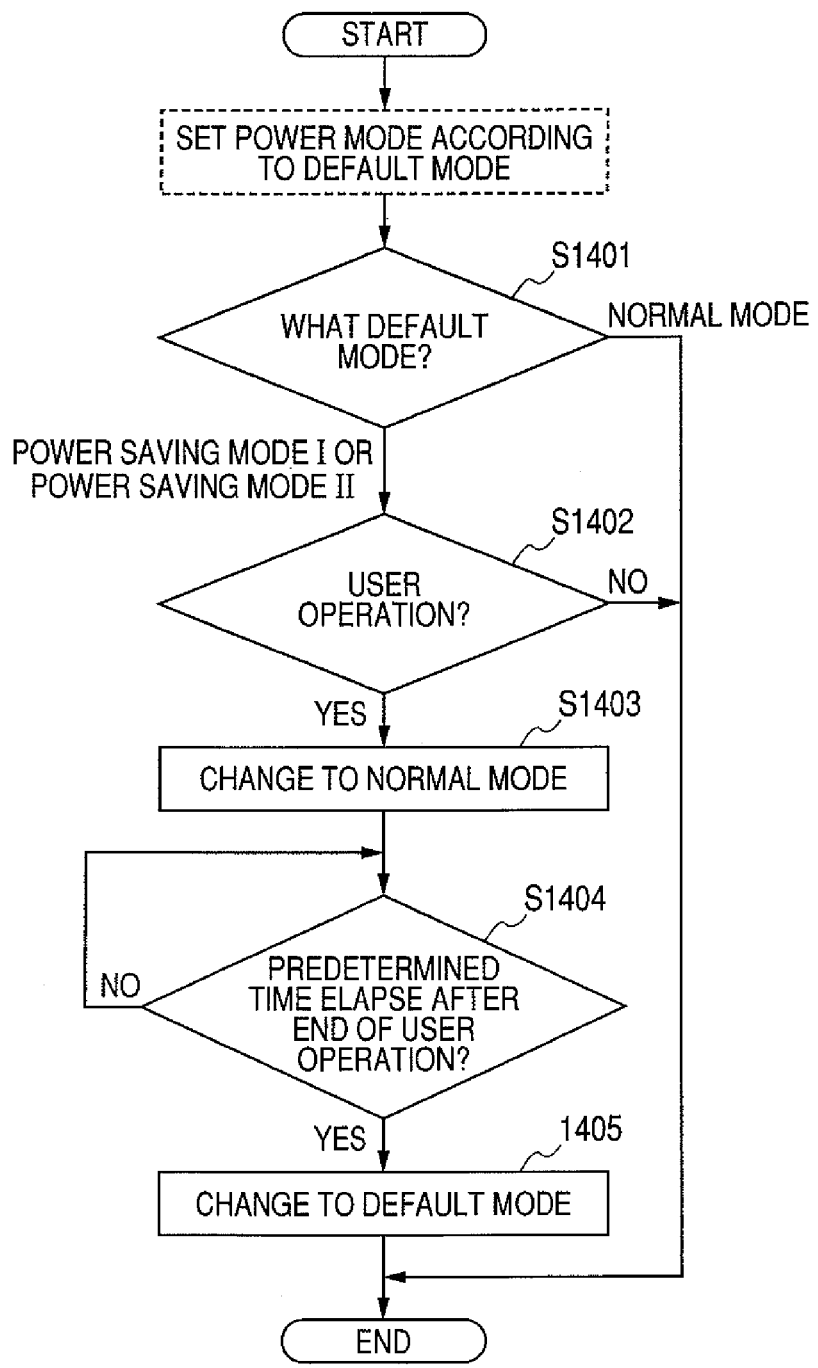
FIG. 14 is a flow chart for describing an operation of the MFP 102 according to the exemplary embodiment of the present invention.

FIGS. 13 and 14 are flow charts for describing a series of processes to be executed by the MFP 102 according to the first exemplary embodiment. More specifically, FIG. 13 illustrates the process to be executed when the instruction to change over the power mode is received from the management server 106, and FIG. 14 illustrates the process to be executed when the power saving mode is temporarily returned to the normal mode in response to a user's operation. Here, it is assumed that, in FIGS. 13 and 14, the processes are intermittently executed according to the illustrated flow charts. Furthermore, it is assumed that a series of operations illustrated on the flow charts of FIGS. 13 and 14 is controlled by the CPU of the MFP 102 based on the program stored in the ROM or the HDD of the MFP 102.

First, in a step S1301, the MFP 102 determines whether or not it is instructed by the management server 106 to change over the power mode. If it is instructed to change over the power mode, the flow advances to a step S1302 to further determine whether or not an instructed power mode is different from the power mode set as a default mode in the MFP 102.

If "NO" in the step S1301 or S1302, the process ends. Meanwhile, if it is determined in the step S1302 that the instructed power mode is different from the power mode set as the default mode, the flow advances to a step S1303 to change over the current power mode to the power mode instructed as the default mode, and then the process ends.

In a step S1401 of FIG. 14, it is determined what mode is the mode set as the default mode. Then, if it is determined that the normal mode is set as the default mode, the process immediately ends.

On the other hand, if it is determined that the power saving mode is set as the default mode, the flow advances to a step S1402 to further determine whether or not a user's operation is executed. Then, if it is determined in the step S1402 that the user's operation is executed, the flow advances to a step S1403 to change over the power mode to the normal mode.

Subsequently, it is determined in a step S1404 whether or not a predetermined time elapses after the latest operation by the user. If it is determined that the predetermined time elapses, the flow advances to a step S1405. Here, it is assumed that the predetermined time is detected by a timer unit provided in the MFP. In the step S1405, the power mode is changed over to the power saving mode set as the default mode, and then the process ends.

As described above, according to the first exemplary embodiment, the server which manages in a lump the settings of the power modes of the information processing apparatuses included in each group instructs each information processing apparatus to change over its power mode. At that time, if the information processing apparatus belonging to the plurality of groups exists and the schedules of the power modes managed in association with these groups are different, it is determined according to the priorities indicated by the user which of the schedules is to be set with priority.

Thus, in case of instructing the information processing apparatus belonging to the plurality of groups to change over its power mode, the proper contents can be instructed according to user's intention.

Second Exemplary Embodiment

Subsequently, the second exemplary embodiment will be described. As described above, in the first exemplary embodiment, in case of instructing the information processing apparatus belonging to the plurality of groups to change over its power mode, if the schedule information managed in association with each group is different from others, it is determined according to the priorities of the groups which schedule information is prioritized.

On the other hand, in the second exemplary embodiment, if the content of the schedule information in one group is different from that in the other group, it is determined according to the contents of schedules which schedule information is to be set with priority. Incidentally, since the basic constitution of the second exemplary embodiment is the same as that of the first exemplary embodiment, the description thereof will be omitted. Meanwhile, only the points different from those in the first exemplary embodiment will be described hereinafter.

Figure 15:
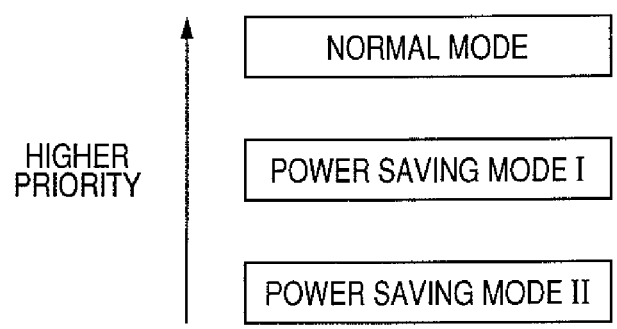
FIG. 15 is a conceptual diagram illustrating priority of power modes according to the exemplary embodiment of the present invention.

FIG. 15 is a conceptual diagram illustrating power mode priority information which is managed in the management server 106. That is, the power mode priority information indicates, in a case where a plurality of schedule information are different from others, priority of power modes to be used to determine which power mode is to be set to each information processing apparatus with priority. In the present exemplary embodiment, the priority of the normal mode is set to be higher than the priority of the power saving mode 1, and the priority of the power saving mode I is set to be higher than the priority of the power saving mode II. Here, it is assumed that the priorities of the respective modes can be freely set by the user.

Figure 16:
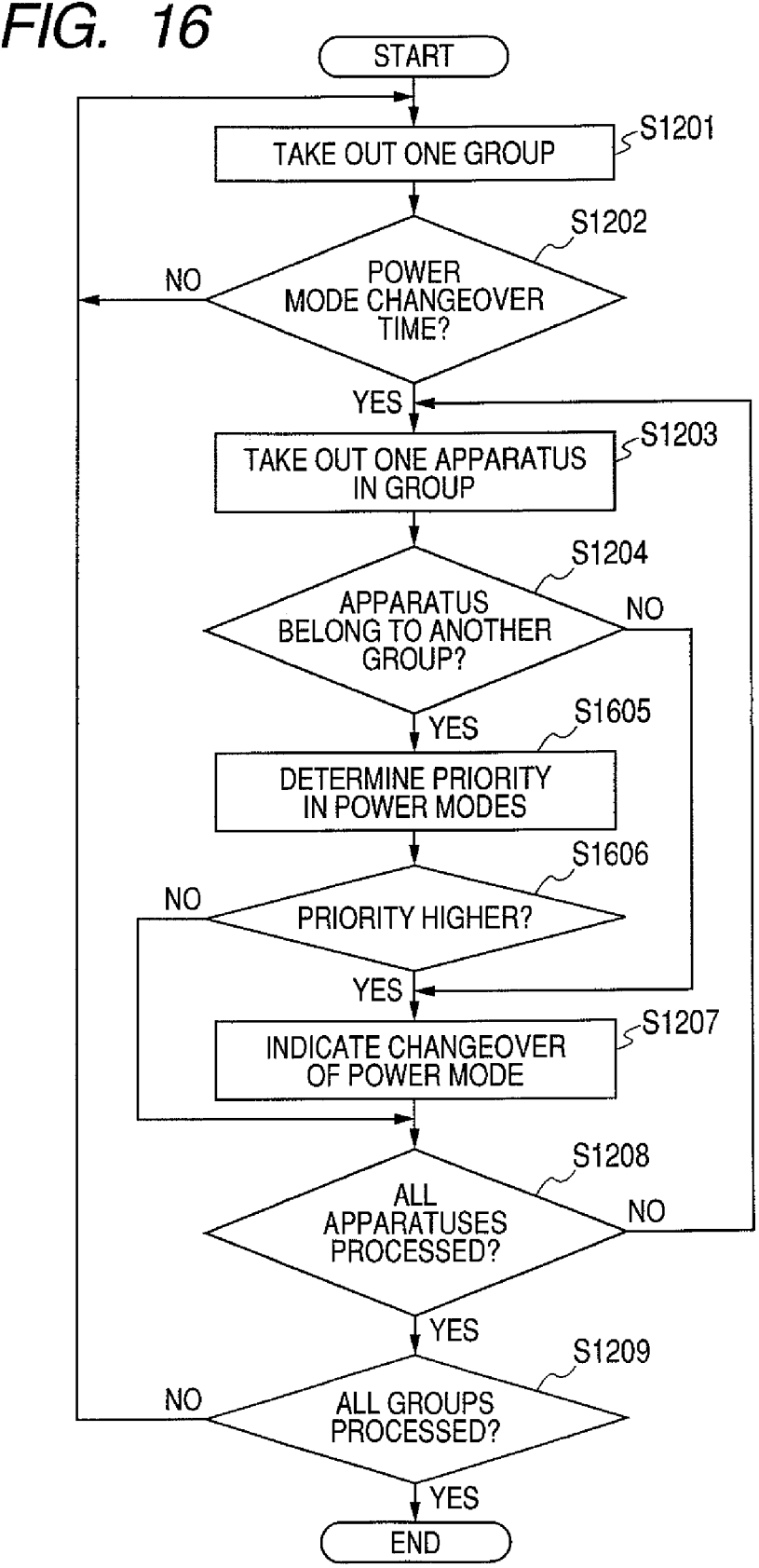
FIG. 16 is a flow chart for describing an operation of the management server 106 according to the exemplary embodiment of the present invention.

FIG. 16 is a flow chart for describing a series of operations to be executed by the management server 106 according to the second exemplary embodiment. Furthermore, it is assumed that the series of operations illustrated on the flow chart of FIG. 16 is controlled by the CPU 801 of the management server 106 based on the program stored in the ROM 803 or the memory 804.

Incidentally, since the steps S1201 to S1204 and the steps S1207 to S1209 in FIG. 16 are respectively the same as those in FIG. 12, the description thereof will be omitted.

In FIG. 16, if it is determined in the step S1204 that the information processing apparatus taken out in the step S1203 belongs to the group other than the group taken out in the step S1201, the flow advances to a step S1605 to compare the priority of the power mode based on the schedule corresponding to the group taken out in the step S1201 with the priority of the power mode based on the schedule corresponding to the other group (that is, the group other than the group taken out in the step S1201), based on the information illustrated in FIG. 15.

Then, in a step S1606, it is determined whether or not the priority of the power mode based on the schedule corresponding to the group taken out in the step S1201 is higher than all of the priorities of the power modes based on the schedules corresponding to other groups. That is, if it is determined that the priority of the power mode based on the schedule corresponding to the group taken out in the step S1201 is higher than all of the priorities of the power modes based on the schedules corresponding to other groups, the flow advances to the step S1207.

On the other hand, if it is determined in the step S1606 that the priority of the power mode based on the schedule corresponding to any other group is higher than the priority of the power mode based on the schedule corresponding to the group taken out in the step S1201, the flow advances to the step S1208.

As described above, according to the second exemplary embodiment, the server which manages in a lump the settings of the power modes in each group instructs each information processing apparatus to change over its power mode. At that time, if the information processing apparatus belonging to the plurality of groups exists and the schedules of the power modes managed in association with these groups are different, it is determined according to the priorities of the power modes which of the schedules is to be set with priority.

Thus, for example, in a case where the schedule information of one group indicates the normal mode and the schedule information of the other group indicates the power saving mode, if the priority of the normal mode is set to be higher than that of the power saving mode, the normal mode can be always set to the information processing apparatus. Namely, in a time zone that the normal mode has to be set to one group, it is possible to prevent that the normal mode set to one group is involuntarily changed over to the power saving mode according to the schedule of the other group.

Third Exemplary Embodiment

Subsequently, the third exemplary embodiment will be described.

Figures 17, 18:
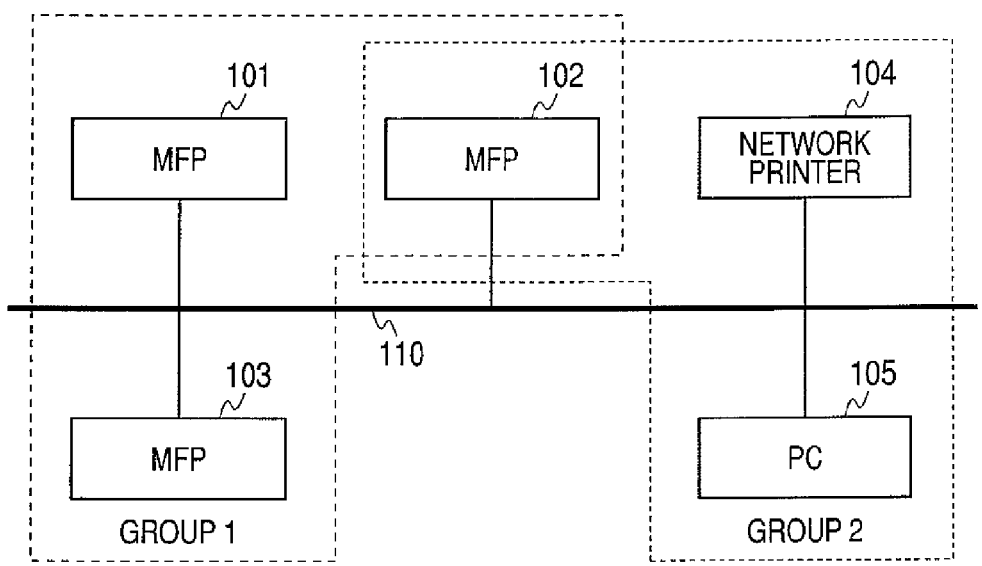
FIG. 17 is a block diagram illustrating a whole system according to the exemplary embodiment of the present invention.
FIG. 18 is a diagram illustrating a group management table according to the exemplary embodiment of the present invention.

FIG. 17 is a block diagram illustrating a whole system including a plurality of information processing apparatuses 101 to 105, according to the third exemplary embodiment of the present invention. In the third exemplary embodiment, as well as the first exemplary embodiment, the MFP's 101, 102 and 103, the network printer 104 and the PC 105 are mutually connected to others through a LAN 110. However, any apparatus corresponding to the management server 106 in the first exemplary embodiment is not provided in the second exemplary embodiment.

In the first exemplary embodiment, the management server 106 manages the plurality of groups each including the plurality of information processing apparatuses on the network, and also manages the schedule information concerning the settings of the power modes in association with each group. On the other hand, in the third exemplary embodiment, any one of the plurality of information processing apparatuses belonging to each group manages the schedule information concerning the settings of the power modes for the relevant group, and instructs each of the information processing apparatuses in the relevant group to change over its power mode.

Further, in the first exemplary embodiment, the settings of the power modes to be instructed to the information processing apparatus belonging to the plurality of groups are competitive between the schedule information of the respective groups, the management server 106 determines which schedule information is to be prioritized. On the other hand, in the third exemplary embodiment, in a case where the information processing apparatus receives instructions to change over its power mode, if the instructed contents are different, the relevant information processing apparatus determines which instruction is to be prioritized.

Incidentally, the constitutions of the MFP's 101 to 103, the network printer 104 and the PC 105 and the contents of the power mode management table are respectively the same as those described in the first exemplary embodiment, whereby the description thereof will be omitted. Further, it is assumed that the MFP 101 is set as the information processing apparatus representative of the group 1 and the PC 105 is set as the information processing apparatus representative of the group 2.

FIG. 18 is a diagram illustrating the group management table which is stored in the HDD 204 of the MFP 101 representative of the group 1. Here, as well as the table illustrated in FIG. 9, names 1801 and IP addresses 1802 of the respective information processing apparatuses included in the group 1 are managed on the group management table illustrated in FIG. 18.

Figures 19, 20, 21:
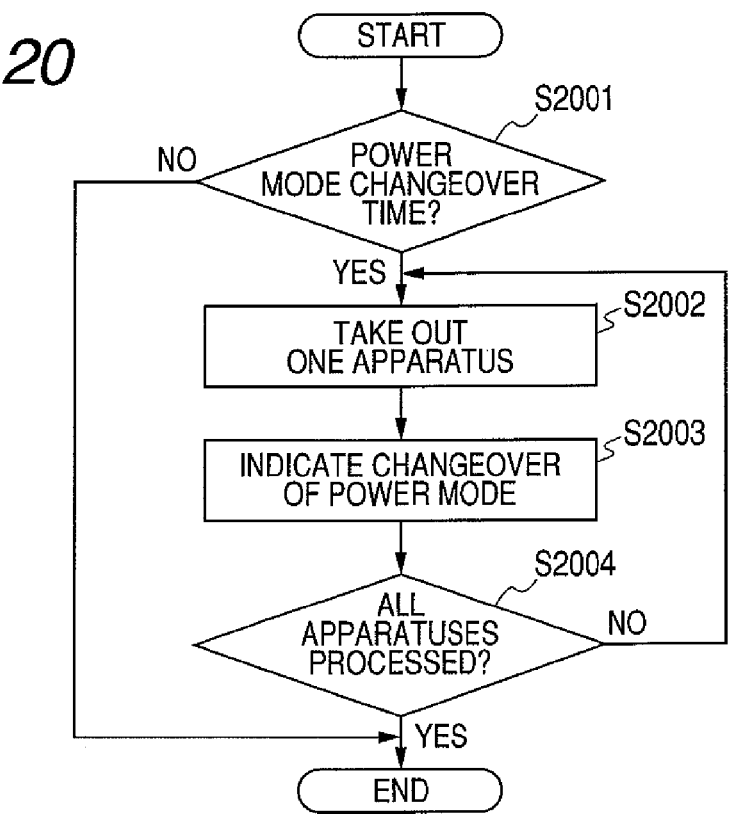
FIG. 19 is a diagram illustrating a schedule management table according to the exemplary embodiment of the present invention.
FIG. 20 is a flow chart for describing an operation of the MFP 101 according to the exemplary embodiment of the present invention.
FIG. 21 is a diagram illustrating default mode information according to the exemplary embodiment of the present invention.

FIG. 19 is a diagram illustrating the schedule management table which is stored in the HDD 204 of the MFP 101 representative of the group 1. As well as the table illustrated in FIG. 10, information 1902 indicating the power modes to be set for respective time zones 1901 in the group 1 is managed on the schedule management table illustrated in FIG. 19.

FIG. 20 is a flow chart for describing a series of processes to be executed by the MFP 101 according to the third exemplary embodiment. Here, it is assumed that a series of operations illustrated on the flow chart of FIG. 20 is controlled by the CPU 201 of the MFP 101 based on the information on the tables illustrated in FIGS. 18 and 19 and the program stored in the ROM 203 or the HDD 204.

Initially, in a step S2001, it is determined based on the schedule management table whether it becomes a power mode changeover time in each information processing apparatus in the group. If it is determined in the step S2001 that it does not become the power mode changeover time, the process ends. On the other hand, if it is determined in the step S2001 that it becomes the power mode changeover time, the flow advances to a step S2002 to take out one information processing apparatus in the group based on the group management table.

Then, in a step S2003, a command for instructing to change over the power mode is transmitted to the information processing apparatus taken out in the step S2002, according to the information on the schedule management table. Then, the flow advances to the step S2004 to determine whether or not the processes to all the information processing apparatuses managed on the group management table end. If the information processing apparatus to which the process does not end exits, the flow returns to the step S2002 to continue the above determination process. On the other hand, if the processes for all the information processing apparatuses end, the process ends.

Incidentally, to manage the power modes in the group 1, the MFP 101 manages the group management table and the schedule management table. However, with respect to the power modes in the group 2, the PC 105 which is representative of the group 2 manages them. That is, the group management table and the schedule management table both set for the group 2 have been stored in the memory 604 of the PC 105, and the CPU 601 of the PC 105 executes the same control as that in the flow chart illustrated in FIG. 20 by properly using the stored tables.

Next, the operation of the MFP 102 in the third exemplary embodiment will be described. As described above, in the third exemplary embodiment, if the instruction to change over the power mode is sent from the device representative of each of the plurality of groups to the MFP 102 belonging to the relevant plurality of groups and the contents of the respective instructions are competitive, the MFP 102 determines which instruction is to be set with priority.

FIG. 21 is a diagram illustrating default mode information stored in the HDD of the MFP 102. In the MFP 102, the default mode information as illustrated in FIG. 21 is updated and managed every time the MFP 102 changes over the power mode to be set as the default mode in response to the changeover instruction from an external information processing apparatus. Here, as illustrated in FIG. 21, the default mode information includes power mode information (2101) set as the default mode and group information (2102) indicating the group to which the information processing apparatus which instructed to set the power mode indicated by the power mode information (2101) as the default mode belongs.

Figure 22:
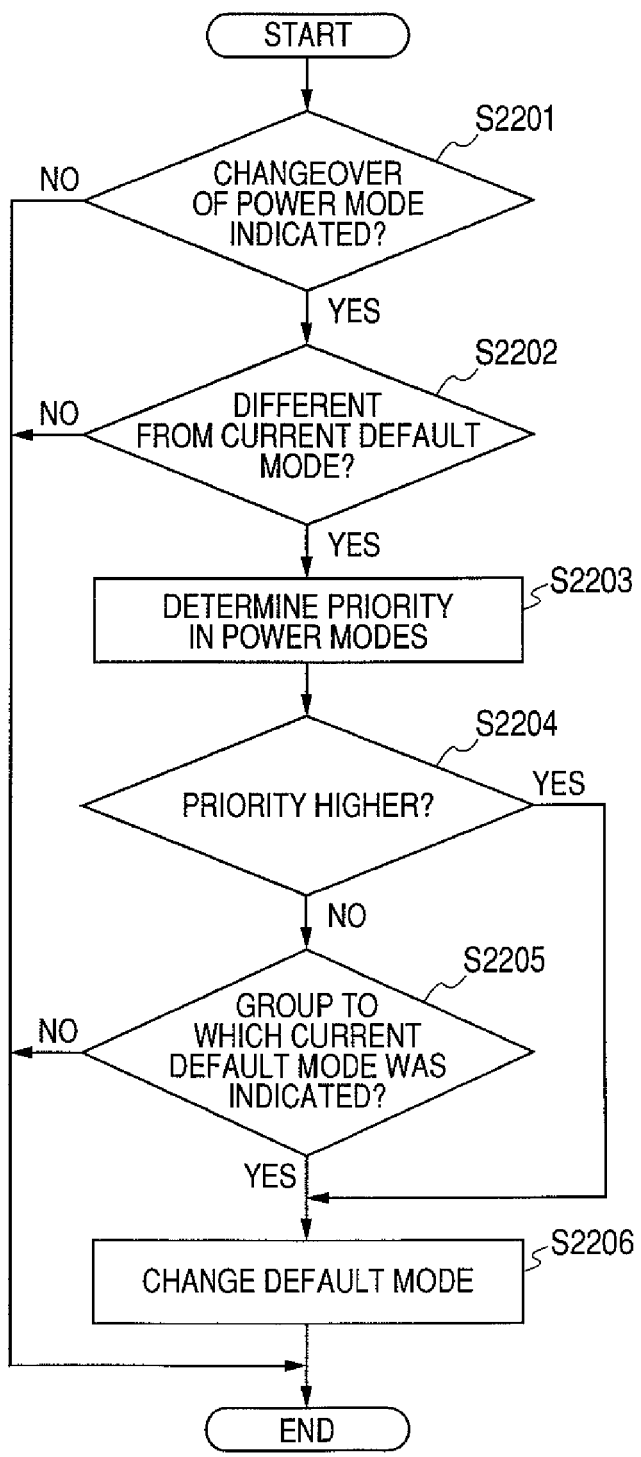
FIG. 22 is a flow chart for describing an operation of the MFP 102 according to the exemplary embodiment of the present invention.

FIG. 22 is a flow chart for describing a series of processes to be executed in the MFP 102 according to the third exemplary embodiment. Here, it is assumed that a series of operations illustrated on the flow chart of FIG. 22 is controlled by the CPU of the MFP 102 based on the default mode information illustrated in FIG. 21 and the program stored in the ROM or the HDD provided in the MFP 102.

Initially, in a step S2201, it is determined whether or not an instruction to change over the power mode is sent from the external information processing apparatus. If it is determined that any instruction to change over the power mode is not sent from the external information processing apparatus, the process ends. On the other hand, if it is determined that the instruction to change over the power mode is sent from the external information processing apparatus, the flow advances to a step S2202 to further determine whether or not the instructed power mode is different from the power mode set as the default mode in the MFP 102.

Here, if it is determined that the instructed power mode coincides with the power mode set as the default mode, the process ends. On the other hand, if it is determined in the step S2202 that the instructed power mode is different from the power mode set as the default mode, the flow advances to a step S2203 to compare the instructed power mode with the power mode set as the default mode so as to detect the priorities of these modes. Here, it should be noted that such comparison and detection processes are substantially the same as those already described in the second exemplary embodiment.

Subsequently, in a step S2204, it is determined based on the result of the comparison in the step S2203 whether or not the priority of the instructed power mode is higher than the priority of the power mode set as the default mode. If it is determined that the priority of the instructed power mode is higher than the priority of the power mode set as the default mode, the flow advances to a step S2206. On the other hand, if it is determined in the step S2204 that the priority of the instructed power mode is not higher than the priority of the power mode set as the default mode, the flow advances to a step S2205.

Then, it is further determined in the step S2205 whether or not the group of the information processing apparatus to which the changeover of the power mode was instructed in the step S2201 is the same as the group of the information processing apparatus to which the power mode being the current default mode was instructed. If it is determined that the group of the information processing apparatus to which the changeover of the power mode was instructed is not the same as the group of the information processing apparatus to which the power mode being the current default mode was instructed, the process ends. On the other hand, if it is determined in the step S2205 that the group of the information processing apparatus to which the changeover of the power mode was instructed is the same as the group of the information processing apparatus to which the power mode being the current default mode was instructed, the flow advances to the step S2206.

In the step S2206, the default mode is changed to the instructed power mode, and then the process ends. Here, it should be noted that the default mode information illustrated in FIG. 21 is used in the determinations of the step S2204 and S2205. Also, in the MFP 102 of the third exemplary embodiment, it is assumed that the process as illustrated on the flow chart of FIG. 14 in the first exemplary embodiment is intermittently executed.

As described above, according to the third exemplary embodiment, the independent information processing apparatus included in the certain group manages the schedule of the settings of the power modes in the respective information processing apparatus included in the relevant group. Also, the independent information processing apparatus included in the certain group instructs to change over the power modes of the information processing apparatuses included in the relevant group. At that time, if the power modes respectively instructed to be changed over from the plurality of groups to which the information processing apparatus belongs are different from others, the relevant information processing apparatus which received the instructions determines which instruction is to be prioritized. More specifically, it is determined which of the priority of the instructed power mode and the power mode previously set as the default mode is higher, and then it is determined based on the determined priority whether or not to change the default mode.

Thus, even if changeover of the power mode is instructed to the information processing apparatus belonging to the plurality of groups, the proper power modes can be selected and set.

Incidentally, each of the functions described in the first to third exemplary embodiments may be provided independently or properly combined with others.

Other Exemplary Embodiments

Incidentally, the exemplary embodiments of the present invention are described as above. However, the present invention is also applicable to, for example, a system, an apparatus, a device, a method, a program, a storage medium (recording medium), or the like. More specifically, the present invention may be applied to a system which includes a plurality of devices, or to an apparatus which includes a single device.

Incidentally, in the present invention, a program code (that is, the programs corresponding to the flow charts illustrated in the attached drawings) of software for achieving the functions of the above-described exemplary embodiments is directly or remotely supplied to a system or an apparatus. In this connection, the present invention includes a case where the relevant system or apparatus reads and executes the supplied program code to achieve the functions of the above-described exemplary embodiments.

Accordingly, to achieve the function processes of the present invention by a computer, also the program code itself installed into the relevant computer achieves the present invention. That is, the present invention includes the computer program itself for achieving the function processes of the present invention.

In this case, any form of the program, such as an object code, a program executed by an interpreter or script data to be supplied to an OS is available without inquiring a program form if having the function of a program.

Then, as a recording medium for supplying the program, for example, a Floppy™ disk, a hard disk, an optical disk, a magnetooptical disk, an MO, a CD-ROM, a CD-R, a CD-RW, a magnetic tape, a nonvolatile memory card, a ROM, a DVD (DVD-ROM, DVD-R), or the like can be used.

As another method of supplying the programs, there is a method of connecting to a website on the Internet by using the browser of a client computer. The programs can be also supplied by downloading the computer program itself of the present invention or a file which is compressed and includes an automatic installing function into a recording medium such as a hard disk from the relevant website. Further, the supplying of the programs can be also realized by dividing program codes constituting the program of the present invention into a plurality of files and downloading the respective files from different websites. That is, a WWW server or an ftp (file transfer protocol) server, which causes users to download program files for realizing the functional processes of the present invention by a computer, is also included in appended claims of the present invention.

The programs of the present invention are encoded and stored into the storage medium such as CD-ROM's which are distributed to users, and key information for solving or decoding the encoded program is made to be downloaded for the user who clears a predetermined condition from the website through the Internet. In addition, the user executes the encoded program by using the key information to install the program into a computer. Thus, the supplying of the program can be also realized.

Further, the present invention also includes not only a case where the functions of the above-described exemplary embodiments are achieved by executing the program read by a computer, but also a case where, for example, an OS or the like functioning on the computer executes all the processes or a part thereof based on an instruction of the program, thereby achieving the functions of the above-described exemplary embodiments by that process.

Furthermore, the present invention also includes a case where the program read from a storage medium is written in a memory provided in a function expansion board inserted in the computer or a function expansion unit connected to the computer, and then a CPU or the like provided in the function expansion board or the function expansion unit executes all the processes or a part thereof based on an instruction of the relevant program, thereby achieving the functions of the above-described exemplary embodiments by that process.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-341131, filed Dec. 19, 2006, which is hereby incorporated by reference herein in its entirety.

What is claimed is:

1. A management apparatus which manages a power mode of each of a plurality of information processing apparatuses, the management apparatus comprising at least a processor and a memory to operate as:

a management unit configured to manage information regarding at least one of the plurality of information processing apparatuses, which belongs to a first group, and information regarding at least one of the plurality of information processing apparatuses, which belongs to a second group, wherein neither of the first and the second groups contains the other;

a setting unit configured to assign different priorities respectively to the first and second groups;

a memory unit configured to store first schedule information indicating a schedule of power modes which are to be set on each information processing apparatus belonging to the first group and second schedule information indicating a schedule of power modes which are to be set on each information processing apparatus belonging to the second group;

an instruction unit configured to instruct an information processing apparatus belonging to the first group to change the power mode based on the first schedule information and instruct an information processing apparatus belonging to the second group to change the power mode based on the second schedule information;

a judging unit configured to judge, after said setting unit performs the assignment, whether an information processing apparatus belongs to both the first group and the second group;

a determination unit configured to determine, in a case where said judging unit determines that an information processing apparatus belongs to both the first group and the second group, which of the power mode indicated by the first schedule information and the power mode indicated by the second schedule information is to be set on the information processing apparatus based on the priorities assigned by said setting unit;

and a control unit configured to control said instruction unit such that the power mode which has been determined by said determination unit is set on the information processing apparatus belonging to both the first group and the second group.

2. A management apparatus according to claim 1, wherein said instruction unit instructs an information processing apparatus to change the power mode, by transmitting to the information processing apparatus information indicating which of a plurality of power modes is to be set on the information processing apparatus.

3. A management apparatus according to claim 2, wherein the plural power modes include at least a normal power mode and a power saving mode of which power consumption is smaller than power consumption of the normal power mode.

4. A management apparatus according to claim 1, wherein said instruction unit instructs an information processing apparatus to change from a first power mode which has been set on the information processing apparatus to a second power mode of which power consumption is smaller than power consumption of the first power mode.

5. A management apparatus according to claim 1, wherein said instruction unit instructs an information processing apparatus to change from a second power mode which has been set on the information processing apparatus to a first power mode of which power consumption is larger than power consumption of the second power mode.

6. A management apparatus according to claim 1, wherein said determination unit determines, from the power mode indicated by the first schedule information and the power mode indicated by the second schedule information, the power mode of which power consumption is larger as the power mode to be set.

7. A management method which manages a power mode of each of a plurality of information processing apparatuses, comprising the steps of:
managing information regarding at least one of the plurality of information processing apparatuses, which belongs to a first group, and at least one of the plurality of information processing apparatuses, which belongs to a second group, wherein neither of the first and the second groups contains the other;
assigning different priorities respectively to the first and second groups;
storing first schedule information indicating a schedule of power modes which are to be set on each information processing apparatus belonging to the first group and second schedule information indicating a schedule of power modes which are to be set on each information processing apparatus belonging to the second group;
instructing an information processing apparatus belonging to the first group to change the power mode based on the first schedule information and instructing an information processing apparatus belonging to the second group to change the power mode based on the second schedule information;
judging, after the assignment is performed in said assigning step, whether an information processing apparatus belongs to both the first group and the second group;
determining, in a case where it is judged in said judging step that an information processing apparatus belongs to both the first group and the second group, which of the power mode indicated by the first schedule information and the power mode indicated by the second schedule information is to be set on the information processing apparatus based on the priorities in said assigning step;
and controlling the instructing step such that the power mode which has been determined in said determining step is set on the information processing apparatus belonging to both the first group and the second group, wherein at least one of said steps is performed by a computer.

8. A management method according to claim 7, wherein said instructing step includes instructing an information processing apparatus to change the power mode, by transmitting to the information processing apparatus information indicating which of a plurality of power modes is to be set on the information processing apparatus.

9. A management method according to claim 8, wherein the plural power modes include at least a normal power mode and a power saving mode of which power consumption is smaller than power consumption of the normal power mode.

10. A management method according to claim 7, wherein said instructing step includes instructing an information processing apparatus to change from a first power mode which has been set on the information processing apparatus to a second power mode of which power consumption is smaller than power consumption of the first power mode.

11. A management method according to claim 7, wherein said instructing step includes instructing an information processing apparatus to change from a second power mode which has been set on the information processing apparatus to a first power mode of which power consumption is larger than power consumption of the second power mode.

12. A management method according to claim 7, wherein said determining step includes determining, from the power mode indicated by the first schedule information and the power mode indicated by the second schedule information, the power mode of which power consumption is larger as the power mode to be set.

13. A non-transitory computer-readable storage medium which stores, in executable form, a program causing a computer to execute a management method of managing a power mode of each of a plurality of information processing apparatuses, the management method comprising the steps of:
managing information regarding at least one of the plurality of information processing apparatuses, which belongs to a first group, and at least one the plurality of information processing apparatuses, which belongs to a second group, wherein neither of the first and the second groups contains the other;
assigning different priorities respectively to the first and second groups;
storing first schedule information indicating a schedule of power modes which are to be set on each information processing apparatus belonging to the first group and second schedule information indicating a schedule of power modes which are to be set on each information processing apparatus belonging to the second group;
instructing an information processing apparatus belonging to the first group to change the power mode based on the first schedule information and instructing an information processing apparatus belonging to the second group to change the power mode based on the second schedule information;
judging, after the assignment is performed in said assigning step, whether an information processing apparatus belongs to both the first group and the second group;
determining, in a case where it is judged in said judging step that an information processing apparatus belongs to both the first group and the second group, which of the power mode indicated by the first schedule information and the power mode indicated by the second schedule information is to be set on the information processing apparatus based on the priorities assigned in said setting step; and controlling said instructing step such that the power mode which has been determined in said determining step is set on the information processing apparatus belonging to both the first group and the second group.

* * * * *